United States Patent
Zhou et al.

(10) Patent No.: US 8,454,846 B1
(45) Date of Patent: Jun. 4, 2013

(54) METHOD AND SYSTEM FOR PROVIDING A FULL WRAP-AROUND SHIELD USING A FRAME CONFIGURED WET ETCH IN A DAMASCENE PROCESS

(75) Inventors: Ronghui Zhou, Fremont, CA (US); Ming Jiang, San Jose, CA (US); Danning Yang, Fremont, CA (US); Yun-Fei Li, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 348 days.

(21) Appl. No.: 12/817,376

(22) Filed: Jun. 17, 2010

(51) Int. Cl.
 *B44C 1/22* (2006.01)
 *G11B 5/31* (2006.01)
(52) U.S. Cl.
 CPC ................................ *G11B 5/3163* (2013.01)
 USPC .............................................. 216/22; 216/83
(58) Field of Classification Search
 None
 See application file for complete search history.

(56) References Cited

U.S. PATENT DOCUMENTS

| | | | |
|---|---|---|---|
| 7,536,777 | B2 | 5/2009 | Lam et al. |
| 8,166,631 | B1 * | 5/2012 | Tran et al. ........................ 216/22 |
| 8,409,453 | B1 | 4/2013 | Jiang et al. |
| 2006/0044681 | A1 | 3/2006 | Le et al. |
| 2007/0115584 | A1 | 5/2007 | Balamane et al. |
| 2008/0002310 | A1 | 1/2008 | Cyrille et al. |
| 2008/0061316 | A1 * | 3/2008 | Cohen ........................ 257/190 |
| 2008/0110761 | A1 | 5/2008 | Lam et al. |
| 2008/0113090 | A1 | 5/2008 | Lam et al. |
| 2009/0166210 | A1 | 7/2009 | Bonhote et al. |

* cited by examiner

*Primary Examiner* — Shamim Ahmed
*Assistant Examiner* — Bradford Gates

(57) ABSTRACT

A method and system for fabricating magnetic recording transducer are described. The magnetic recording transducer has a main pole including a plurality of sides, an intermediate layer adjacent to the sides of the main pole, and a field region distal from the main pole. The method and system include providing at least one trench in the intermediate layer. The trench(es) are between the main pole and the field region. The method and system also include providing a stop layer. A portion of the stop layer resides in at least part of the trench (es) and on at least part of the field region. The method and system also include removing a portion of the intermediate layer using a wet etch. The stop layer is resistant to removal by the wet etch. The method and system also include depositing a full wrap-around shield layer on the main pole.

16 Claims, 15 Drawing Sheets

ABS View

METHOD AND SYSTEM FOR PROVIDING A FULL WRAP-AROUND SHIELD USING A FRAME CONFIGURED WET ETCH IN A DAMASCENE PROCESS

BACKGROUND

FIG. 1 is a flow chart depicting a conventional method 10 for fabricating a conventional perpendicular magnetic recording (PMR) transducer. For simplicity, some steps are omitted. A conventional, PMR pole and chemical mechanical planarization (CMP) stop layer are provided, via step 12. The conventional pole is magnetic and has a top wider than its bottom. In addition, the conventional pole may have a bevel, so that the conventional pole is shorter in the region of the air-bearing surface (ABS) location. The ABS location is the location at which the ABS will reside in the completed structure. The conventional pole is typically provided in an insulating layer, such as aluminum oxide. The conventional pole may be covered by a mask, the conventional CMP stop layer deposited, and the mask removed.

A wrap-around shield is desired to be provided on the conventional pole. Thus, the field regions, distal from the conventional pole, are masked, via step 14. The mask also extends over a portion of the device region. However, the region in which the wrap-around shield is to be provided is exposed. A wet etch is performed, via step 16. The wet etch removes the exposed portion of the aluminum oxide. The wrap-around shield layers are provided, via step 18. Step 18 may include providing a mask having an aperture exposing the region in which the wrap-around shield is to be deposited. Seed and magnetic layers are then deposited and the mask removed. An aluminum oxide refill layer is deposited and a chemical mechanical planarization (CMP) is performed, via step 20. In addition, an ion mill may be performed. A conventional gap layer and top shield are then provided, via step 22. The conventional gap layer is nonmagnetic and may be insulating. The conventional gap layer is typically alumina deposited using atomic layer deposition (ALD).

FIG. 2 depicts a portion of a conventional PMR transducer 50 formed using the conventional method 10. The conventional transducer 50 includes an underlayer 52, an aluminum oxide layer 54, a conventional pole 56, a nonmagnetic layer 58, a CMP stop layer 60, a conventional gap 62, and a conventional wraparound shield 64. Thus, using the conventional method 10, a pole 54 having a trailing edge bevel and wrap-around shield 62 may be formed.

Although the conventional method 10 may provide the conventional PMR transducer 50, there may be drawbacks. The CMP stop layer 56 is prone to collapse. There may be significant variations in the height of the pole 56 and surrounding regions after the CMP of step 20. Further, the conventional pole 60 may exhibit poor pole integrity. Accordingly, what is needed is an improved method for fabricating a PMR transducer.

SUMMARY

A method and system for fabricating magnetic recording transducer are described. The magnetic recording transducer has a main pole including a plurality of sides, an intermediate layer adjacent to the sides of the main pole, and a field region distal from the main pole. The method and system include providing at least one trench in the intermediate layer. The trench(es) are between the main pole and the field region. The method and system also include providing a stop layer. A portion of the stop layer resides in at least part of the trench (es) and on at least part of the field region. The method and system also include removing a portion of the intermediate layer using a wet etch. The stop layer is resistant to removal by the wet etch. The method and system also include depositing a wrap-around shield layer on the main pole

DETAILED DESCRIPTION OF THE PREFERRED EMBODIMENTS

Figure 1:
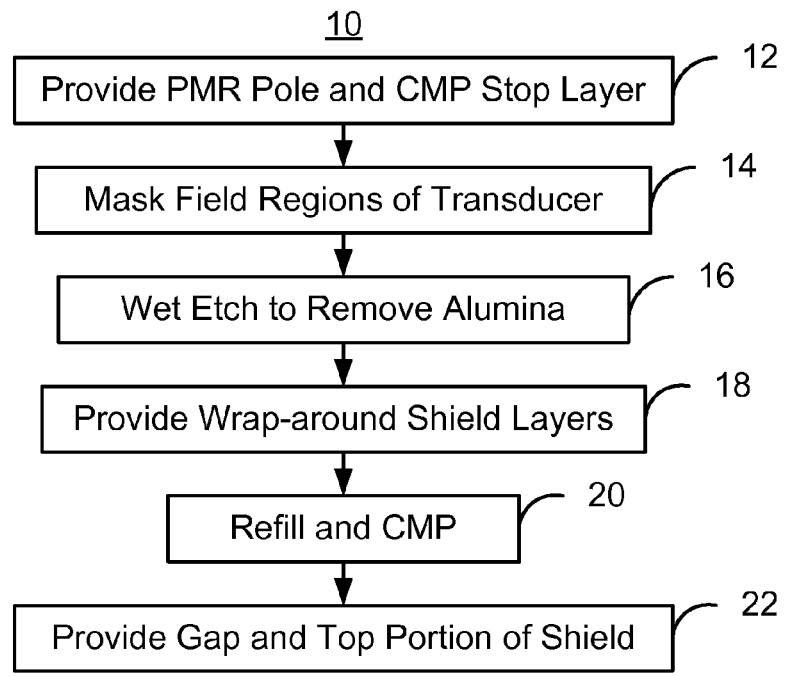
FIG. 1 is a flow chart depicting a conventional method for fabricating a PMR transducer.
Figure 2:
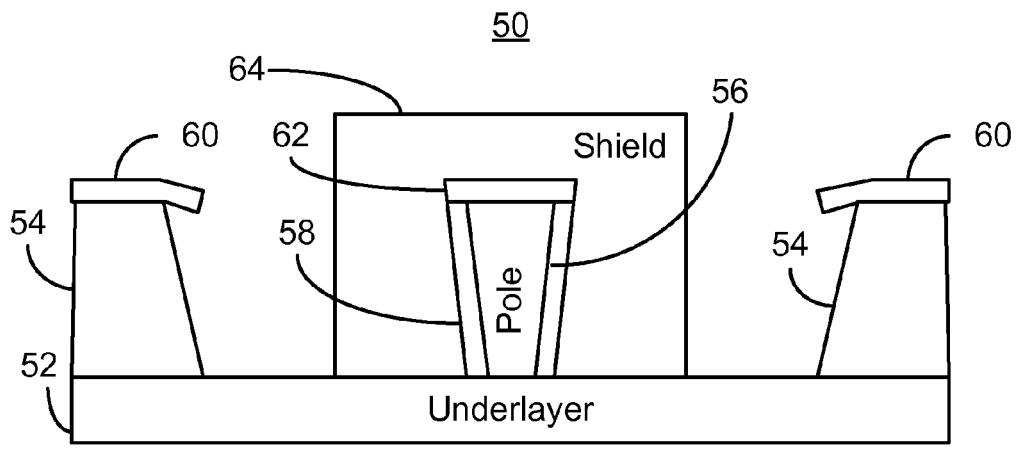
FIG. 2 is a diagram depicting a conventional PMR transducer.
Figure 3:
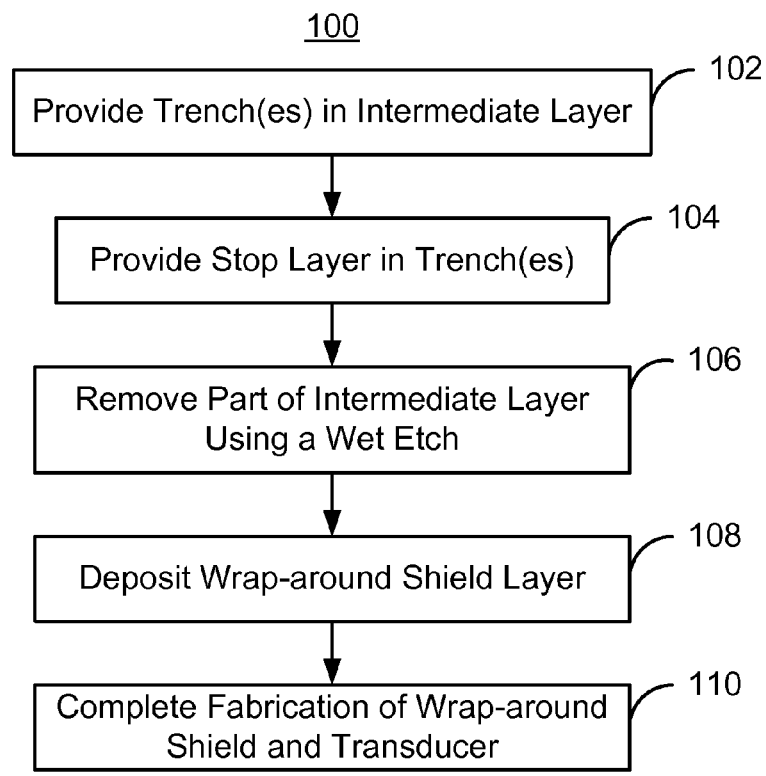
FIG. 3 is a flow chart depicting an exemplary embodiment of a method for fabricating a shield of a write transducer.

FIG. 3 is a flow chart depicting an exemplary embodiment of a method 100 for fabricating a transducer. The method 100 is described in the context of a PMR transducer, though other transducers might be so fabricated. For simplicity, some steps may be omitted and/or combined. The transducer being fabricated may be part of a merged head that also includes a read head (not shown) and resides on a slider (not shown) in a disk drive. The method 100 also may commence after formation of other portions of the transducer. The method 100 is also described in the context of providing a shield for a single main pole in a single magnetic recording transducer. However, the method 100 may be used to fabricate multiple shields and/or multiple transducers at substantially the same time. The method 100 and system are also described in the context of particular layers. However, in some embodiments, such layers may include multiple sub-layers. In one embodiment, the method 100 commences after formation of the main pole. The main pole resides in an intermediate layer, such as aluminum oxide. The main pole may be a PMR pole having its top wider than its bottom. In addition, a top, or trailing edge, bevel may also be provided in the pole. A bottom, or leading edge, bevel might also be provided in the pole. The magnetic transducer may also include field regions that are distal from the main pole. For example, the field regions may be three to six microns or more from a wrap-around shield to be fabricated on the main pole. In some embodiments, a stop layer, such as a Ru stop layer may also be deposited on the top surface of the main pole and the intermediate layer adjacent to the main pole prior to the method 100 commencing.

One or more trenches are provided in the intermediate layer in which the main pole materials have been deposited, via step 102. The trenches are between the main pole and the field region. Step 102 may be performed by providing a mask having an aperture on either side of the pole, etching through the optional Ru layer, and etching the intermediate layer. In some embodiments, the Ru and intermediate layers are etched using the appropriate reactive ion etch (RIE). The edges of the trenches furthest from the main pole are further from the main pole than the outer edges of the wrap-around shield to be fabricated.

A stop layer is provided, via step 104. A portion of the stop layer resides in part of the trenches and on at least part of the field region. The stop layer does not cover the main pole, part of the intermediate layer remaining after the formation of the trenches and between the main pole and the field regions. For example, step 104 may include blanket depositing a stop layer over the region of the main pole and the field regions and then providing a mask that exposes a region around the main pole. The exposed portions of the stop layer are then removed. In another embodiment, step 104 may include providing a mask that covers the main pole, and then depositing the stop layer. The mask is then removed. Thus, the stop layer fabricated in step 104 forms a frame around the region in which the wrap-around shield is to be formed. The edges of the stop layer closest to the main pole are further from the main pole than the outer edges of the wrap-around shield being fabricated.

A portion of the intermediate layer exposed by the stop layer is removed using a wet etch, via step 106. The stop layer is resistant to removal by the wet etch. For example, for an aluminum oxide intermediate layer, the stop layer may be Ru as Ru is resistant to removal by an aluminum oxide wet etch. In some embodiments, the stop layer alone may be used as a mask for the wet etch. In other embodiments, an additional mask, such as a photoresist mask, may also be used.

Wrap-around shield layers are deposited on the main pole after the aluminum oxide is removed, via step 108. Step 108 may include depositing seed layers as well as magnetic layers for the shield. For example, step 108 may include plating a Ta/Ru seed layer and then plating a NiFe magnetic layer. A wrap-around shield mask that defines the outer edges of the wrap-around shield may be provided, for example after the seed layer is deposited. After deposition of the magnetic layer(s), any masks used may be removed.

Fabrication of the wrap-around shield and magnetic transducer may then be completed, via step 108. Step 108 may include removal of the NiFe seed layer, depositing a nonmagnetic refill layer, such as aluminum oxide and planarizing the transducer, for example using a CMP. The stop layer provided in step 104 may also function as a stop layer for the planarization process. An additional mill which removes any remaining variations in the surface of the transducer may also be performed. Step 108 may also include providing a write gap on the main pole and providing a top portion of the wrap-around shield. In some embodiments, the top portion of the wrap-around shield is in physical contact with the magnetic layer deposited in step 108. In other embodiments, the gap layer might extend across the remaining portion of the wrap-around shield layers deposited in step 108. Remaining structures, such as coils, return poles and/or shields and other features may also be fabricated.

Figure 4:
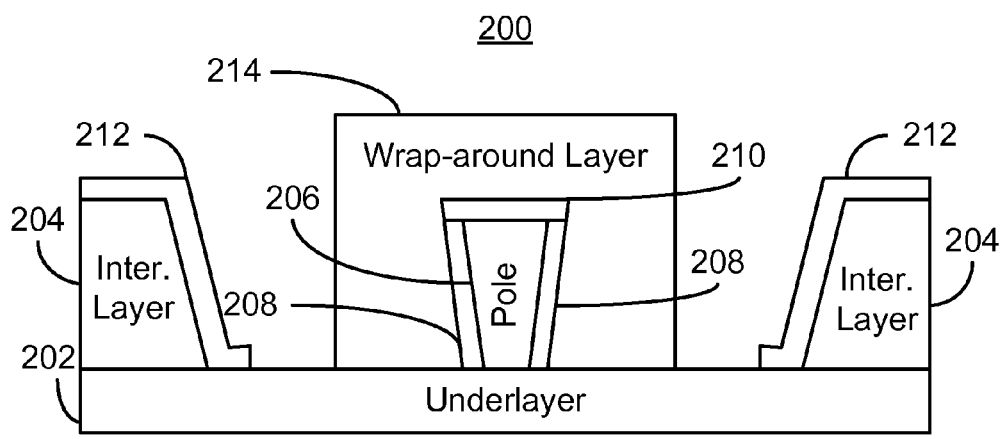
FIG. 4 is a diagram depicting an exemplary embodiment of a PMR transducer.

FIG. 4 is a diagram depicting an exemplary embodiment of a portion of a transducer 200 that may be formed using the method 100. For clarity, FIG. 4 is not to scale. FIG. 4 an ABS view of the transducer 200. The transducer 200 may be a PMR transducer and is shown after completion of step 108. The PMR transducer 200 includes underlayer 202, intermediate layer 204, and a main pole 206 having nonmagnetic layers 208 and 210 surrounding the main pole 206. In some embodiments, one or more of these nonmagnetic layers 208 and 210 may include a stop layer such as Ru. The main pole 206 may include high moment magnetic materials such as CoNiFe. The intermediate layer 204 is nonmagnetic and may be insulating. For example, the intermediate layer 204 may include a material such as aluminum oxide. The transducer 200 may also include field regions, which are not shown for clarity. Wrap-around shield layer 214 has been deposited on the transducer 200. Although shown as a single layer, multiple layers may be provided as part of the wrap-around shield layer 214.

In addition, stop layer 212 is shown. The stop layer 212 is provided in step 104 and forms a frame around at least the region in which the wrap-around shield layer 214 is formed. The edges of the stop layer 212 would reside in the trenches formed in step 102. In some embodiments, the stop layer is a Ru layer that is at least three hundred and not more than seven hundred Angstroms thick. In addition, in some embodiments, the stop layer 212 is deposited as a full film, covering the field regions as well as other regions proximate to the pole, including the yoke of the main pole. In the embodiment shown, both the underlayer 202 and the stop layer 212 are resistant to the wet etch that removes a portion of the intermediate layer (not shown) around the main pole 208 and between the edges of the stop layer 212. After deposition of the wrap-around shield layer 214 in step 108, the region between the wrap-around shield layers 214 and the stop layer 212 may be refilled. A planarization, such as a CMP may also be performed in step 110. Further, other components may also be fabricated.

Using the method 100, a transducer 200 having improved yield and performance may be fabricated. As discussed previously, use of the conventional method 10 to fabricate the wrap-around shield may result in poor pole integrity. It has been determined that the removal of the aluminum oxide through a wet etch in step 16 of the conventional method may be uncontrolled. As a result, an uncontrolled wet etch front edge may extend under some portion of the conventional CMP stop layer 60. This unintended removal of the corners of the aluminum oxide 54 may result in collapse the conventional CMP stop layer 60 on the aluminum oxide 65 and poor pole integrity. Collapse of the conventional stop layer 60 may also result in greater variations in the CMP performed for the conventional method 10. In contrast, the method 100 of FIG. 3 may fabricate in the stop layer 212 depicted in FIG. 4. The stop layer 212 presents a frame for the main pole 206 during the wet etch of step 106. As a result, removal of the intermediate layer in the wet etch step 106 is controlled. Thus, a clean region around the main pole 206 may be provided. Further, as the stop layer 212 extends to the underlayer 202, the front edge of the wet etch is controlled. Stated differently, portions of the intermediate layer 204 separated from the main pole 206 by the stop layer 212 may not be inadvertently removed. Consequently, collapse of the stop layer 212 may be avoided. As a result, the uniformity of a CMP performed in step 110 may be improved. Further, the stop layer 212 may extend over other regions, such as the yoke of the main pole 206 and the field regions (not shown). Consequently, dishing around the yoke and other regions covered by the stop layer 212 may be reduced or eliminated. The uniformity of the CMP, as well as the pole 206 may also be improved. The inner edges of the stop layer 212 may also correspond to the outer edge of the wrap-around shield layer 212 being provided. As such, the region proximate to the wrap-around shield layer 214 may protrude from the remainder of the transducer 200. Consequently, a planarization/CMP may be used to better remove protrusion caused by the wrap-around shield layer 214. In some embodiments, the masks used to fabricate the stop layer 212 do not have a critical dimension (smallest printable feature) requirement. Thus, these benefits may be achieved without complicating the fabrication process.

Figure 5:
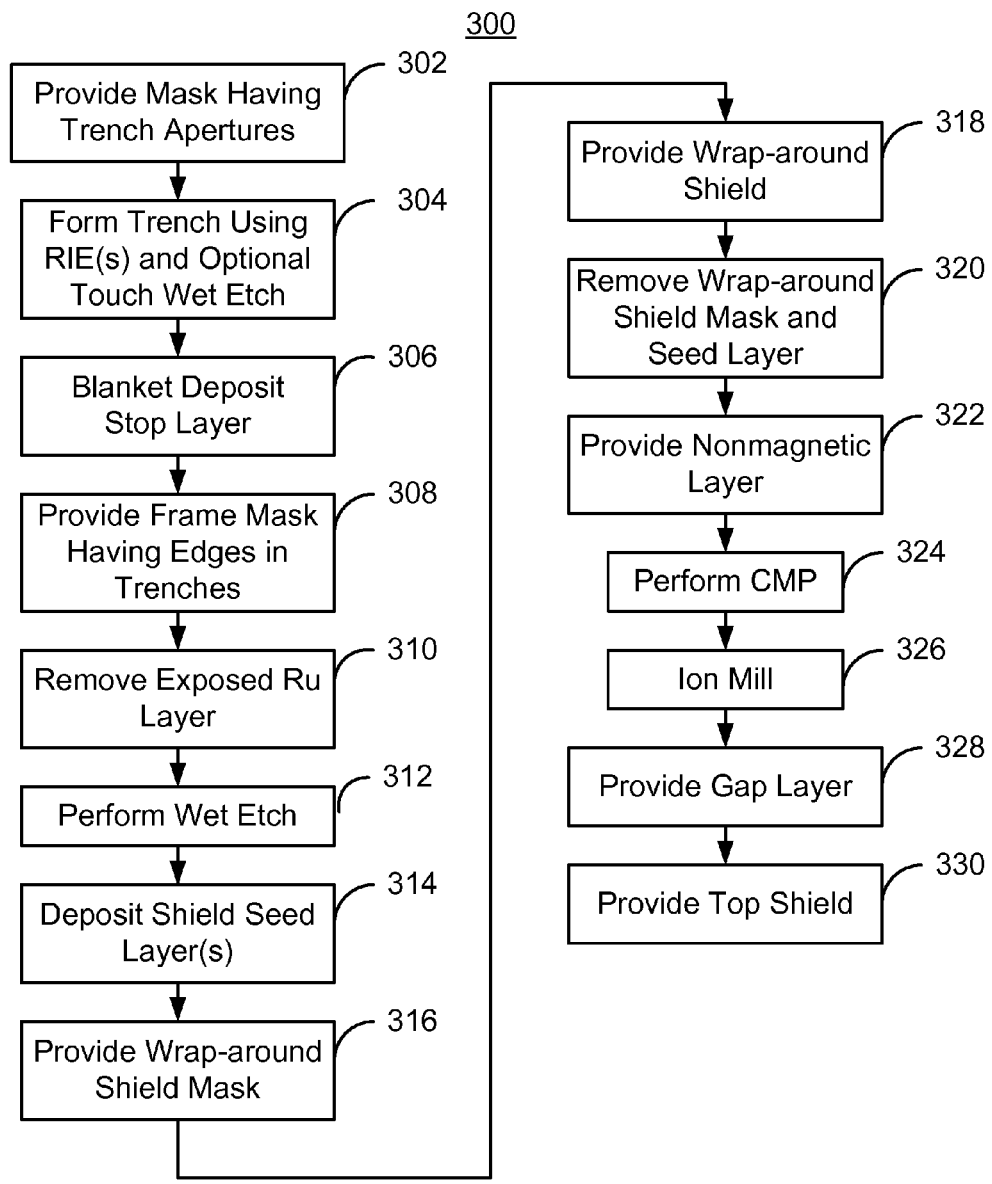
FIG. 5 is a diagram depicting another exemplary embodiment of a method for fabricating a wrap-around shield of a write transducer.

FIG. 5 is a diagram depicting another exemplary embodiment of a method 300 for fabricating a wrap-around shield of a write transducer. For simplicity, some steps may be omitted. FIGS. 6-17 are diagrams depicting portions of an exemplary embodiment of a write transducer 400 during fabrication. For clarity, FIGS. 6-17 are not to scale. Referring to FIGS. 5-17, the method 300 is described in the context of the transducer 400. However, the method 300 may be used to form another device (not shown). The transducer 400 being fabricated may be part of a merged head that also includes a read head (not shown in FIGS. 6-17) and resides on a slider (not shown) in a disk drive. The method 300 also may commence after formation of other portions of the transducer 400, such as the main pole. The main pole resides in an intermediate layer, such as aluminum oxide. The main pole may be a PMR pole having its top wider than its bottom. In addition, trailing and/or leading edge bevels may also be provided in the pole. The magnetic transducer may also include field regions that are distal from the main pole. For example, the field regions may be three to six microns or more from a wrap-around shield to be fabricated on the main pole. In some embodiments, a stop layer, such as a Ru stop layer may also be deposited on the top surface of the main pole and the intermediate layer adjacent to the main pole prior to the method 300 commencing. The method 300 is also described in the context of providing a single transducer 400. However, the method 300 may be used to fabricate multiple transducers at substantially the same time. The method 300 and device 400 are also described in the context of particular layers. However, in some embodiments, such layers may include multiple sublayers.

Figure 6:
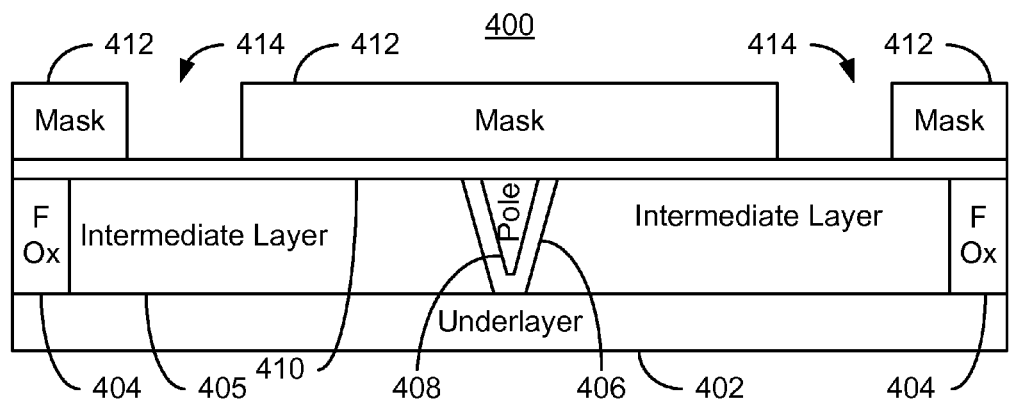
FIGS. 6-17 are diagrams depicting an exemplary embodiment of a write transducer during fabrication.

A mask including trench apertures between the main pole and the field regions is provided, via step 302. The mask may be a photoresist mask or may be a hard mask. FIG. 6 depicts an ABS view of the transducer 400 after step 302 is performed. The transducer 400 includes an underlayer 402 and an intermediate layer 405 in which the main pole 408 is formed. The underlayer 402 may include Cr. A liner 406 is between the main pole 408 and the intermediate layer. The intermediate layer 405 may include aluminum oxide. The main pole 408 may include CoNiFe and/or other high magnetization materials. The liner 406 may include a material that is resistant to an etch of the intermediate layer 405, such as Ru. In another embodiment, a seed layer might also be provided between the liner 406 and the main pole 408. Also shown are field regions 404. A mask layer 410 has also been provided. In some embodiments, the mask layer 410 is a thick Ru layer, on the order of 3000-7000 Angstroms. However, in other embodiments, the mask layer 410 may include other materials and/or have other thicknesses. Ru may be used because Ru is resistant to removal during processes which remove the intermediate layer 405, such as an aluminum oxide RIE or wet etch. Also shown is a photoresist mask 412. The mask 412 includes two trench apertures 414 therein. The trench apertures 414 are located above and thus expose regions of the intermediate layer 405 in which the trenches are to be formed. The trench apertures 414 are thus between the main pole 408 and the field regions 404.

At least one RIE is performed to remove material under the trench apertures, via step 304. In one embodiment, two RIEs are performed. A first RIE transfers the pattern from the photoresist mask 414 to the mask layer 410. Thus, trench apertures would also be formed in the Ru mask layer 410. The photoresist mask 412 might then be removed. A second RIE configured to remove the intermediate layer 405 is also performed. Thus, an aluminum oxide RIE may be performed to form trenches in the intermediate layer 405. In addition, formation of the trenches in step 304 may include performing a touch wet etch. Such a wet etch may be used to remove any remaining intermediate layer material residing in the trenches being formed.

Figure 7:
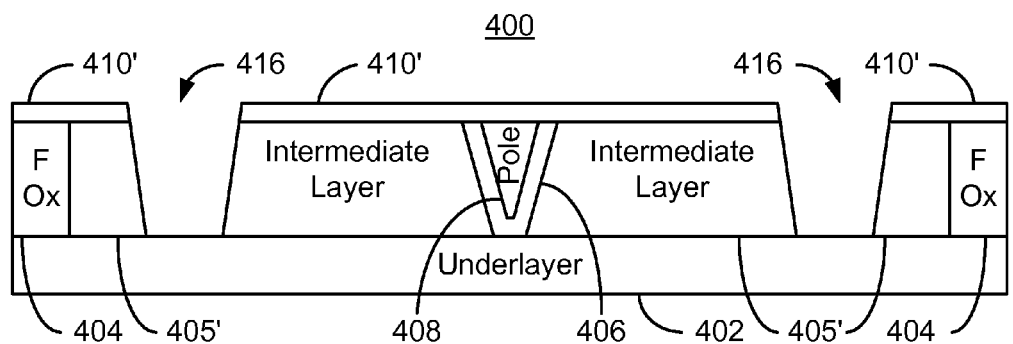

FIG. 7 depicts an ABS view of the transducer 400 after step 304 is performed. Thus, portions of the mask layer 410' and intermediate layer 405' have been removed to form trenches 416. The sidewalls of the trenches 416 that are furthest from the main pole 408 are farther from the main pole 408 than the outer edges of the wrap-around shield to be formed in the region occupied by the intermediate layer 405'.

Figure 8:
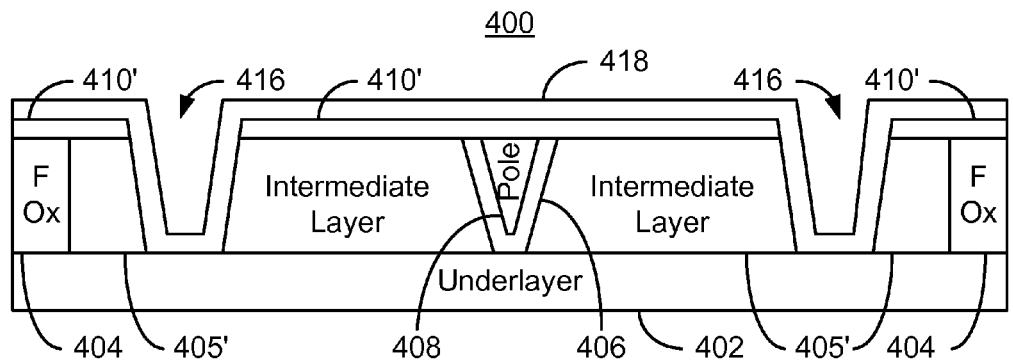

A stop layer is blanket deposited, via step 306. In some embodiments, step 306 includes blanket depositing a Ru layer. FIG. 8 depicts an ABS view of the transducer 400 after step 306 is performed. Stop layer 418 is thus shown. Because it is blanket deposited, the stop layer covers trenches 416, main pole 408, and field regions 404. In some embodiments, the stop layer 418 also covers other portions of the main pole 408, such as the yoke (not shown in FIG. 8). The stop layer 418 is resistant to an etch, such as a wet etch, that removes the intermediate layer 405'. Thus, in the embodiment shown, Ru may be used for the stop layer 418 as Ru is resistant to an aluminum oxide wet etch. Use of Ru may have an additional benefit in that Ru may also be used as a CMP stop layer. In some embodiments, the layer of Ru for the stop layer 418 is at least three hundred Angstroms and not more than seven hundred Angstroms.

Figure 9:
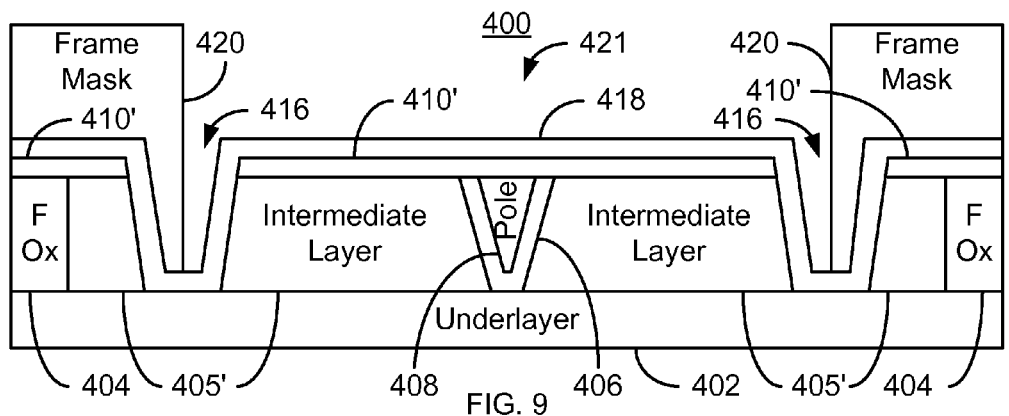

A frame mask that covers a portion of the stop layer 418 is provided, via step 308. Step 308 includes depositing a photoresist layer and transferring a pattern to the photoresist layer. FIG. 9 depicts an ABS view of the transducer 400 after step 308 is performed. Thus, a frame mask 420 has been formed. The frame mask 420 has an aperture 421 therein. The portion of the Ru layer residing in at least part of the trenches and on at least part of the field regions 404 is covered by the frame mask 420. The aperture 421 exposes the main pole 408 and a portion of the intermediate layer 405' that is adjacent to the main pole 408.

Figure 10:
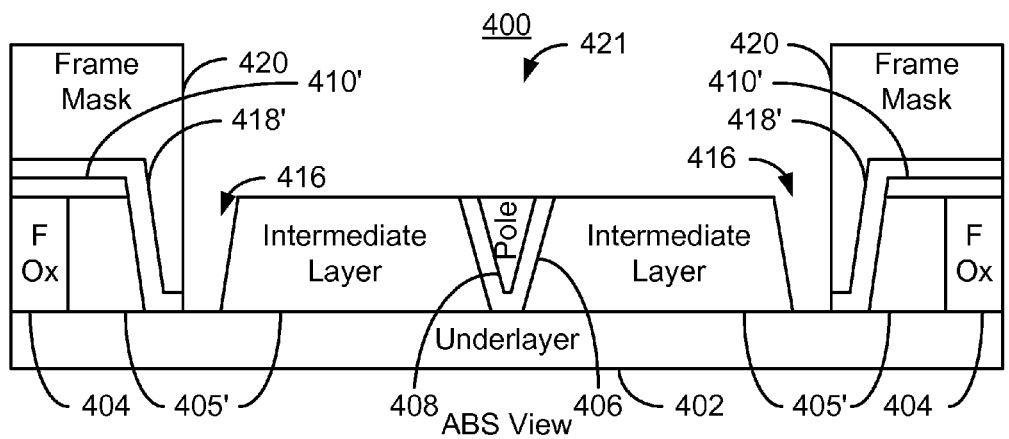
Figure 10:
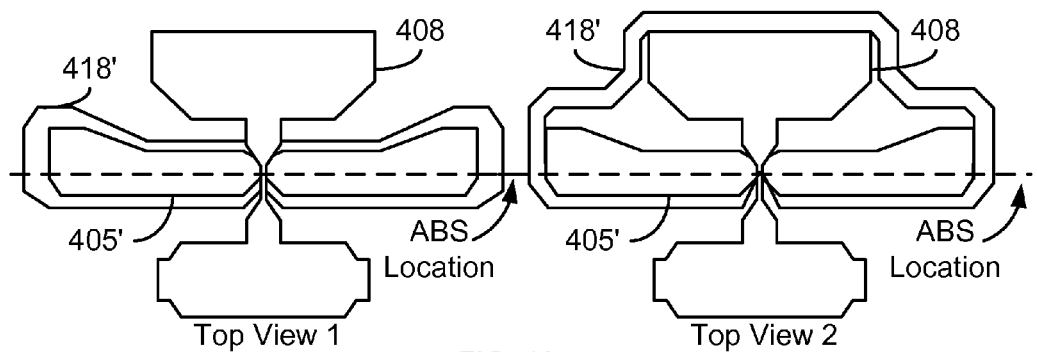

An exposed portion of the stop layer 418 uncovered by the aperture 421 in the frame mask 420 is removed, via step 310. The portion of the mask layer 410 that is in the aperture 421 is also removed. In some embodiments, step 310 includes ion milling the exposed mask layer 410 and the exposed stop layer 418 in the aperture 421. FIG. 10 depicts ABS and top views of the transducer 400. Two different embodiments are shown in the top views (Top View 1 and Top View 2). Thus stop layer 418' remains. In some embodiments, the stop layer 418' only surrounds a portion of the pole 408 proximate to the ABS location (Top View 1). In other embodiments, the stop layer 418' may surround more of the pole 408, as is shown in Top View 2. As can be seen in FIG. 10, the stop layer 418' terminates such that there is some space between the intermediate layer 405' exposed in the aperture 421 and the remaining portion of the stop layer 418'. Thus, through steps 306, 308, and 310, the stop layer is provided.

Figure 11:
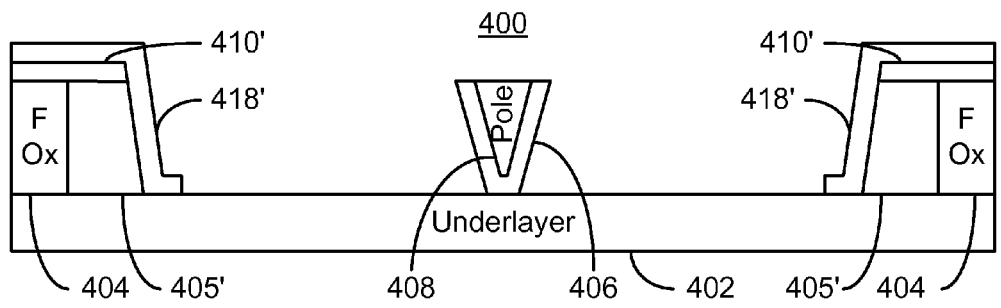

The portion of the intermediate layer 405' exposed by the aperture 421 and the stop layer 418' is removed using a wet etch while the frame mask is in place, via step 312. The stop layer 418' is resistant to removal by the wet etch. FIG. 11 depicts an ABS view of the transducer 400 after step 312 has been performed. Thus, the underlayer 402 has been exposed. Because of the presence of the stop layer 418', only the intermediate layer 405' under the stop layer 418' remains.

Figure 12:
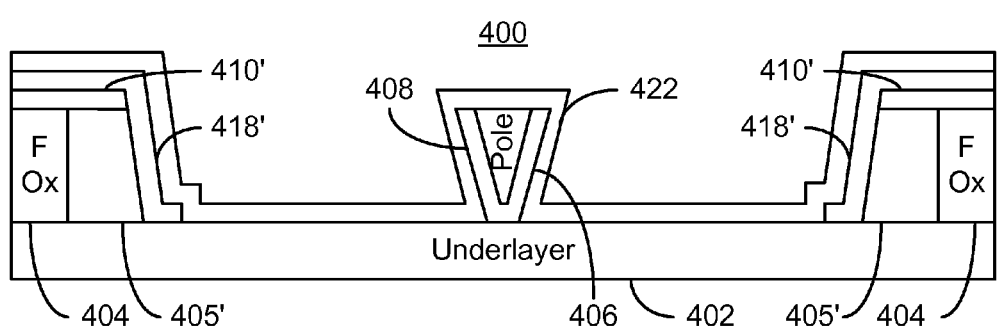
Figure 13:
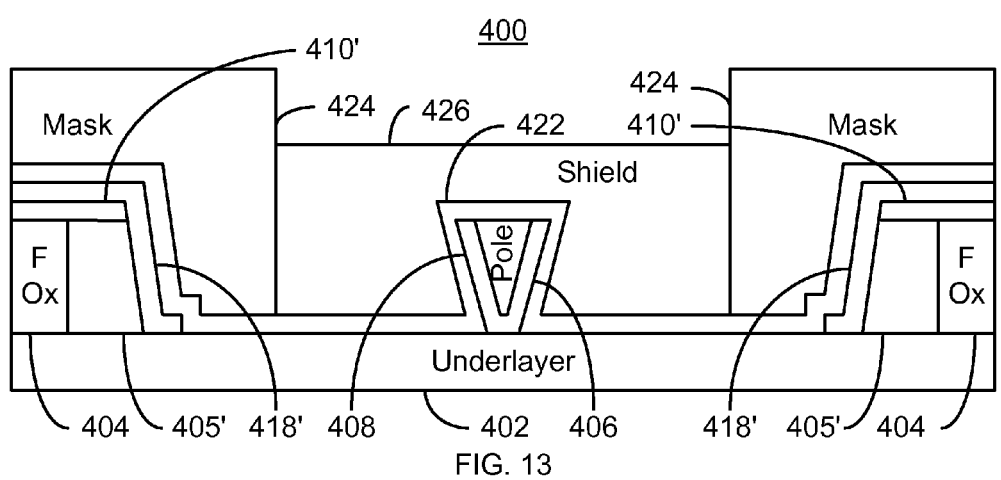

A wrap-around shield for the main pole is provided in the aperture in steps 314, 316, and 318. The seed layer for the wrap-around shield is deposited, via step 314. FIG. 12 depicts an ABS view of the transducer 400 after step 314 is completed. Thus, a seed layer 422 is shown. A wrap-around shield mask is provided, via step 316. The wrap-around shield mask exposes the portion of the transducer 400 in which the wrap-around shield is to be provided. The mask thus covers a portion of the transducer 400 that includes the edges of the stop layer 418'. In some embodiments, the edges of the wrap-around shield mask would reside closer to the pole than the outer edges of the trenches 416 formed in step 304. The magnetic layer(s) for the wrap-around shield are deposited, via step 318. Step 318 may include plating the shield materials. FIG. 13 depicts an ABS view of the transducer 400 after step 320 has been performed. Thus, wrap-around shield mask 424 and shield 426 are shown. The shield 426 may include materials such as NiFe.

Figure 14:
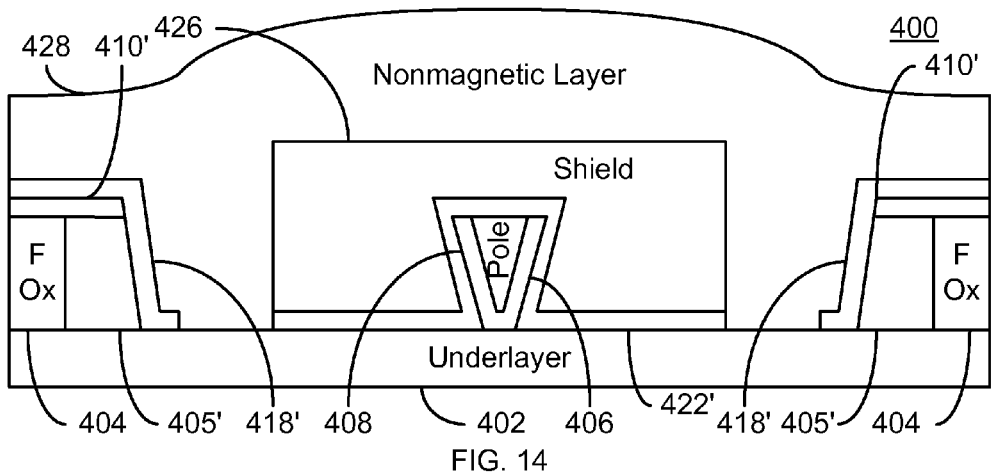

The wrap-around shield mask 424 is removed, via step 320. The seed layer may also be removed in step 320, for example through a full film ion mill. Thus, a space between the shield 426 and the stop layer 418' is opened. A nonmagnetic layer covering at least the wrap-around shield 426 is provided, via step 322. Thus, the space opened in step 320 is refilled in step 322. In some embodiments, step 322 includes depositing a layer of aluminum oxide. FIG. 14 depicts an ABS view of the transducer 400 after step 322 is performed. Thus, nonmagnetic layer 428 is shown. Further, as the shield 426 protrudes slightly with respect to the stop layer 418'. The nonmagnetic layer 428 protrudes further, as shown in FIG. 14.

Figure 15:
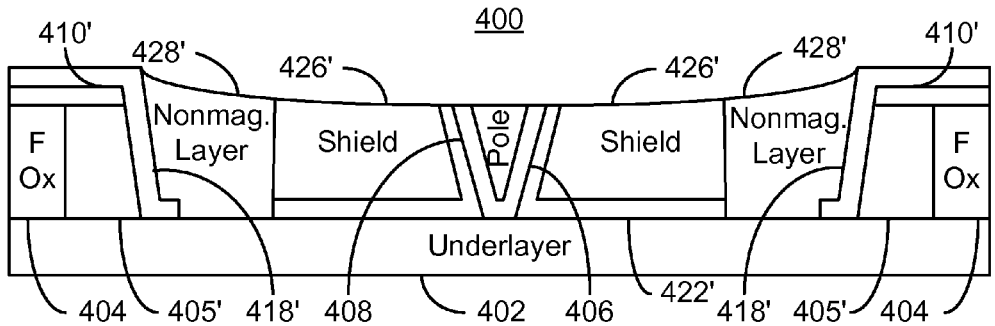

A chemical mechanical polish (CMP) of the transducer 400 is performed, via step 324. The CMP performed in step 324 is configured to remove the nonmagnetic layer 428. Thus, in some embodiments, the CMP is an aluminum oxide CMP. The stop layer 418' is a stop layer for the CMP performed in step 324. Thus, the stop layer 418' is resistant to removal by the CMP of step 324. Thus, as previously discussed, the stop layer 418' may be a Ru layer. FIG. 15 depicts an ABS view of the transducer 400 after step 324 is performed. As the CMP is configured to remove aluminum oxide and the region above the pole 408 protrudes, portions of the nonmagnetic layer 428 and shield 426 have been removed. Nonmagnetic layer 428' and shield 426' remain. Because the stop layer 418' is a stop layer for the CMP, at least a portion of the stop layer 418' remains.

Figure 16:
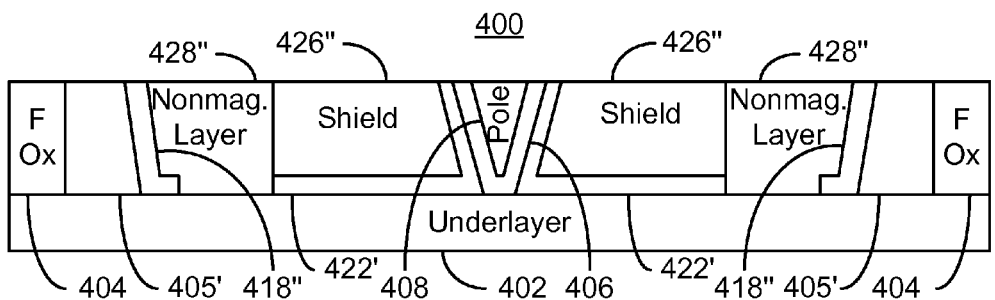

However, as shown in FIG. 15, there may be some dishing after the CMP of step 324 is performed. Thus, an ion mill may be performed, via step 326. FIG. 16 depicts an ABS view of the transducer 400 after step 326 is performed. Thus, portions of the stop layer 418' and mask layer 410' have been removed. Stop layer 418'' remains, while in the embodiment shown, the mask layer 410' may be completely removed. Portions of the shield 426'' also remain. In addition, the top surface of the transducer 400 is substantially flat.

Figure 17:
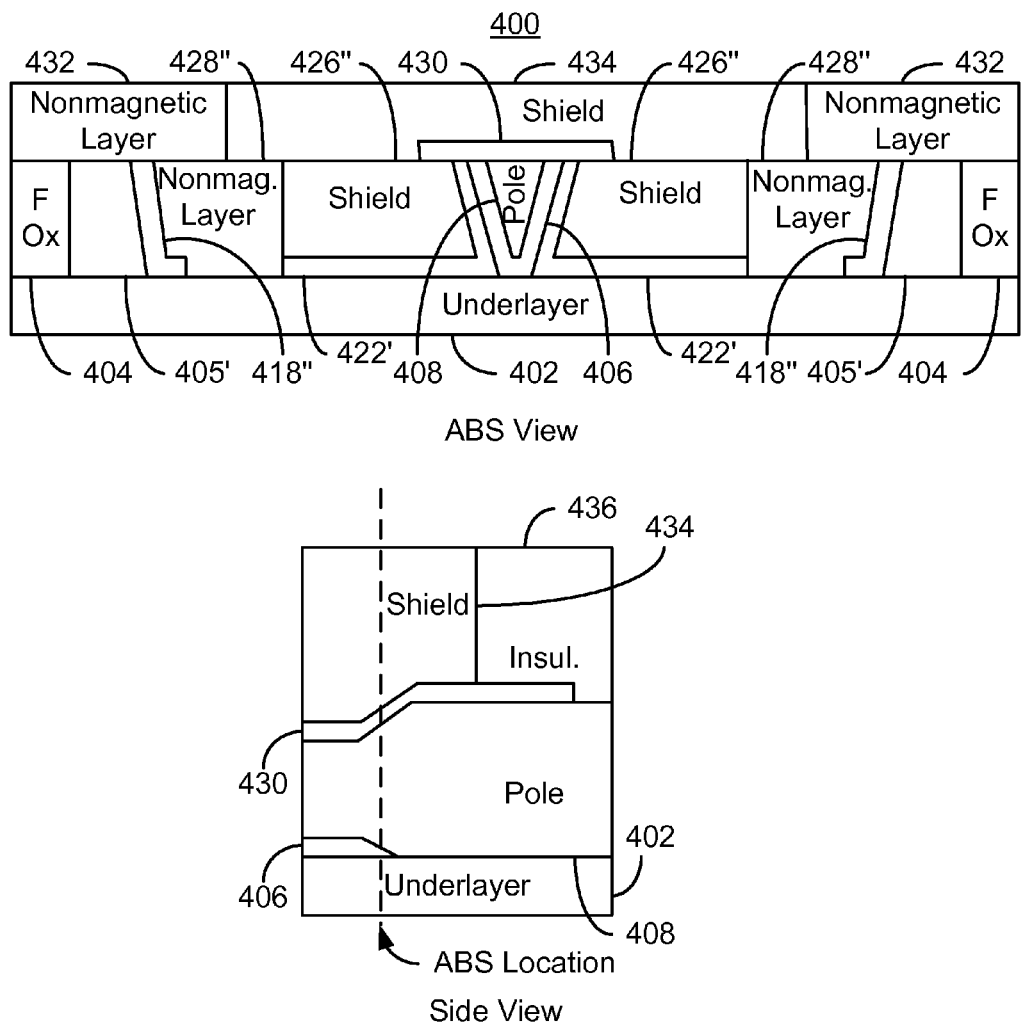

A gap layer is provided on the main pole, via step 328. Step 328 may include depositing a conductive or insulating nonmagnetic layer. For example, aluminum oxide may be used as an insulating, nonmagnetic gap layer. Ru may be used as the conductive gap layer. Providing the gap layer in step 328 may include depositing the gap layer, then removing the gap away from the pole. A top shield that covers at least the gap layer is provided, via step 330. In some embodiments, the top shield physically connects with the wrap-around shield 426''. However, in other embodiments, the gap layer may be interposed completely between the top shield and the wrap-around shield 426''. FIG. 17 depicts ABS and side views of the transducer 400 after step 330 is performed. Thus, gap layer 432 and top shield 434 are shown. In addition, a nonmagnetic layer 432 and an insulating layer 436 have also been provided. In the embodiment shown, the wrap-around shield 426'' and top shield 434 wrap around the pole 408. Thus, the top shield 434 and shield 426'' may be considered to form the wrap-around shield. In some embodiments, the insulating layer 436 and nonmagnetic layer 432 may be the same material. In the embodiment shown, the main pole 408 includes leading and trailing edge bevels. However, in other embodiments, the leading edge bevel and/or the trailing edge bevel may be omitted.

Using the method 300, a transducer 400 having improved yield and performance may be fabricated. The stop layer 418' provides a frame for the main pole 408 during the wet etch of step 312. As a result, removal of the intermediate layer in the wet etch step 312 is controlled. Collapse of the stop layer 418' may be avoided. The uniformity of a CMP performed in step 324 may thus be improved. Further, dishing around the yoke and other regions covered by the stop layer 418' may be reduced or eliminated. The uniformity of the CMP, as well as the pole 408 may also be improved. The region proximate to the wrap-around shield layer 426 may protrude from the remainder of the transducer 400. Consequently, the planarization/CMP of step 324 may be used to better remove protrusion caused by the wrap-around shield layer 426. In some embodiments, the frame mask 420 used to fabricate the stop layer 418' do not have a critical dimension (smallest printable feature) requirement. Thus, these benefits may be achieved without complicating the fabrication process.

Figure 18:
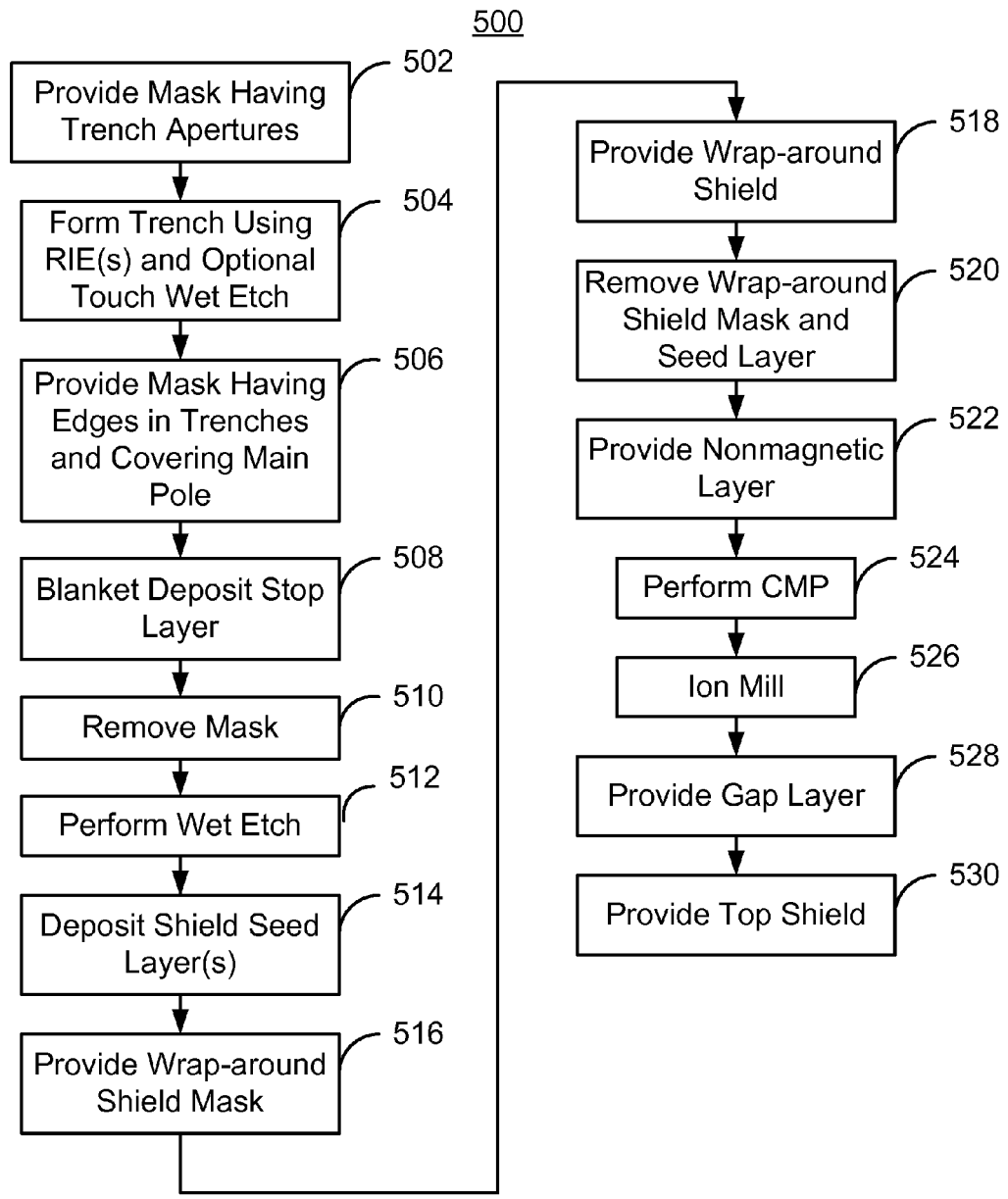
FIG. 18 is a flow chart depicting another exemplary embodiment of a method for fabricating a wrap-around shield of a write transducer.

FIG. 18 is a flow chart depicting another exemplary embodiment of a method 500 for fabricating a wrap-around shield of a write transducer. For simplicity, some steps may be omitted. FIGS. 19-29 are diagrams depicting portions of an exemplary embodiment of a write transducer 600 during fabrication. For clarity, FIGS. 19-29 are not to scale. Referring to FIGS. 18-29, the method 500 is described in the context of the transducer 600. However, the method 500 may be used to form another device (not shown). The transducer 600 being fabricated may be part of a merged head that also includes a read head (not shown in FIGS. 19-29) and resides on a slider (not shown) in a disk drive. The method 500 also may commence after formation of other portions of the transducer 600, such as the main pole. The main pole resides in an intermediate layer, such as aluminum oxide. The main pole may be a PMR pole having its top wider than its bottom. In addition, trailing and/or leading edge bevels may also be provided in the pole. The magnetic transducer may also include field regions that are distal from the main pole. For example, the field regions may be three to six microns or more from a wrap-around shield to be fabricated on the main pole. In some embodiments, a stop layer, such as a Ru stop layer may also be deposited on the top surface of the main pole and the intermediate layer adjacent to the main pole prior to the method 300 commencing. The method 500 is also described in the context of providing a single transducer 600. However, the method 500 may be used to fabricate multiple transducers at substantially the same time. The method 500 and device 600 are also described in the context of particular layers. However, in some embodiments, such layers may include multiple sublayers.

Figure 19:
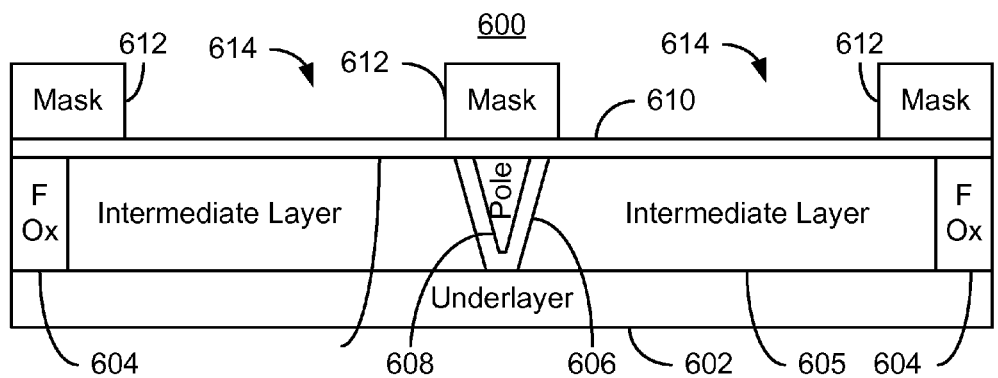
FIGS. 19-29 are diagrams depicting an exemplary embodiment of a write transducer during fabrication.

A mask including trench apertures between the main pole and the field regions is provided, via step 502. The mask may be a photoresist mask or may be a hard mask. FIG. 19 depicts an ABS view of the transducer 600 after step 302 is performed. The transducer 600 includes an underlayer 602 and an intermediate layer 605 in which the main pole 608 is formed. The underlayer 602 may include Cr. A liner 606 is between the main pole 608 and the intermediate layer. The intermediate layer 605 may include aluminum oxide. The main pole 608 may include CoNiFe and/or other high magnetization materials. The liner 606 may include a material that is resistant to an etch of the intermediate layer 605, such as Ru. In another embodiment, a seed layer might also be provided between the liner 606 and the main pole 608. Also shown are field regions 604. A mask layer 610 has also been provided. In some embodiments, the mask layer 610 is a thick Ru layer, on the order of 3000-7000 Angstroms. However, in other embodiments, the mask layer 610 may include other materials and/or have other thicknesses. Ru may be used because Ru is resistant to removal during processes which remove the intermediate layer 605, such as an aluminum oxide RIE or wet etch. Also shown is a photoresist mask 612. The mask 612 includes two trench apertures 614 therein. The trench apertures 614 are located above and thus expose regions of the intermediate layer 605 in which the trenches are to be formed. The trench apertures 614 are thus between the main pole 608 and the field regions 604. Note that the trench apertures 614 differ from the trench apertures 414 of the transducer 400. In particular, the trench apertures 614 are wider. In the embodiment shown, the trench apertures 614 extend substantially to the edges of the pole 608. The outer edges of the trench apertures 614, distal from the pole 608, extend past the region in which the wrap-around shield is to be formed.

At least one RIE is performed to remove material under the trench apertures, via step 504. In one embodiment, two RIEs are performed. A first RIE transfers the pattern from the photoresist mask 614 to the mask layer 610. Thus, trench apertures would also be formed in the Ru mask layer 610. The photoresist mask 612 might then be removed. A second RIE configured to remove the intermediate layer 605 is also performed. Thus, an aluminum oxide RIE may be performed to form trenches in the intermediate layer 605. In addition, formation of the trenches in step 504 may include performing a touch wet etch. Such a wet etch may be used to remove any remaining intermediate layer material residing in the trenches being formed.

Figure 20:
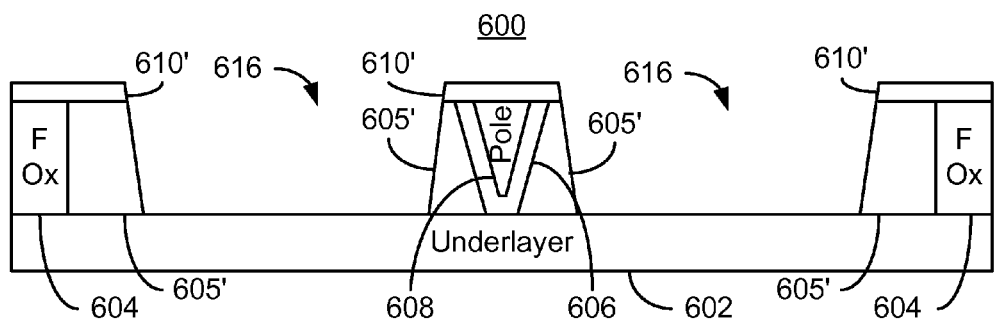

FIG. 20 depicts an ABS view of the transducer 600 after step 504 is performed. Thus, portions of the mask layer 610' and intermediate layer 605' have been removed to form trenches 616. The sidewalls of the trenches 616 that are furthest from the main pole 608 are farther from the main pole 608 than the outer edges of the wrap-around shield to be formed in the region occupied by the intermediate layer 605'. Some portion of the intermediate layer 605' remains adjacent to the pole 608. However, the trenches 616 extend to proximate to the pole 608.

Figure 21:
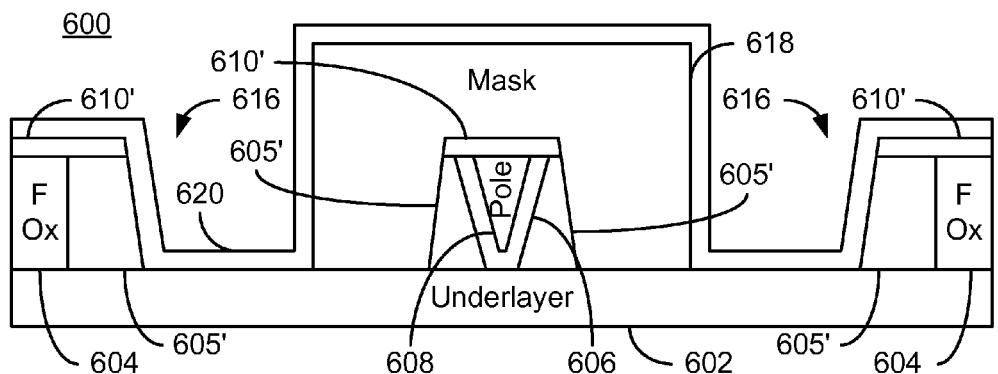

A mask that covers the main pole 608 is provided, via step 506. The mask also has edges that reside in the trenches 616. The mask provided in step 506 may be a photoresist mask. A stop layer is blanket deposited, via step 508. In some embodiments, step 508 includes blanket depositing a Ru layer. FIG. 21 depicts an ABS view of the transducer 600 after step 508 is performed. Mask 618 and stop layer 620 are shown. The edges of the mask 618 reside in the trenches 616 and farther from the main pole 608 than the outer edges of the wrap-around shield to be provided. Because it is blanket deposited, the stop layer 620 covers trenches 616, main pole 608, and field regions 604. In some embodiments, the stop layer 620 also covers other portions of the main pole 608, such as the yoke (not shown in FIG. 21). The stop layer 620 is resistant to an etch, such as a wet etch, that removes the intermediate layer 605'. Thus, in the embodiment shown, Ru may be used for the stop layer 620 as Ru is resistant to an aluminum oxide wet etch. Use of Ru may have an additional benefit in that Ru may also be used as a CMP stop layer. In some embodiments, the layer of Ru for the stop layer 620 is at least three hundred Angstroms and not more than seven hundred Angstroms.

Figure 22:
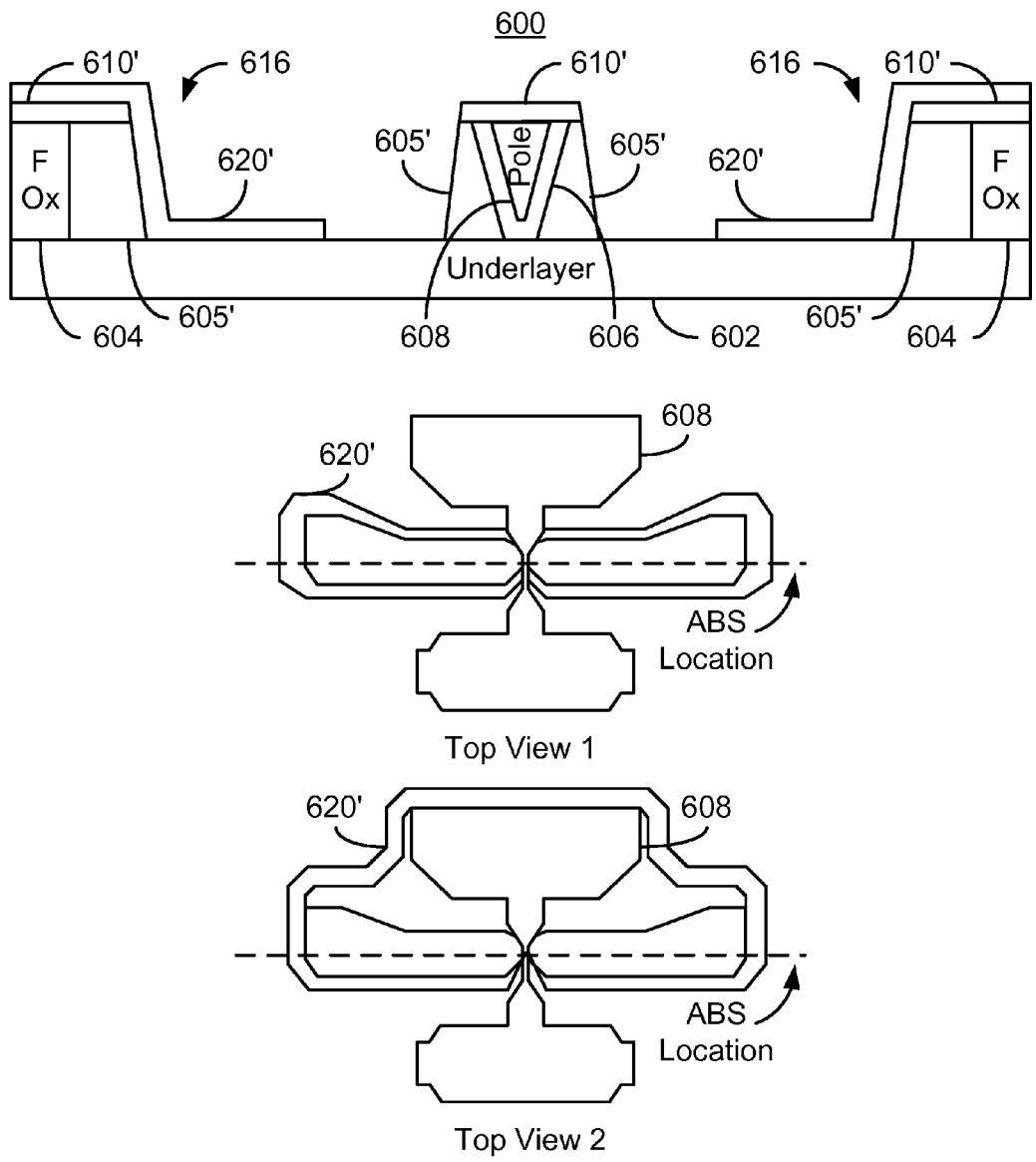

The mask 618 is removed, via step 510. Step 510 may include performing a photoresist strip. Thus, the portion of the stop layer 620 on the mask 618 is also removed. FIG. 22 depicts ABS and top views of the transducer 600 after step 510 is performed. Because the mask 618 has been removed, stop layer 620' remains. Two different embodiments are shown in the top views (Top View 1 and Top View 2). In some embodiments, the stop layer 620' only surrounds a portion of the pole 608 proximate to the ABS location (Top View 1). In other embodiments, the stop layer 620' may surround more of the pole 608, as is shown in Top View 2. As can be seen in FIG. 22, the stop layer 620' terminates such that there is some space between the exposed portion of the intermediate layer 605' and the remaining portion of the stop layer 620'. Thus, through steps 506, 508, and 510, the stop layer is provided.

Figure 23:
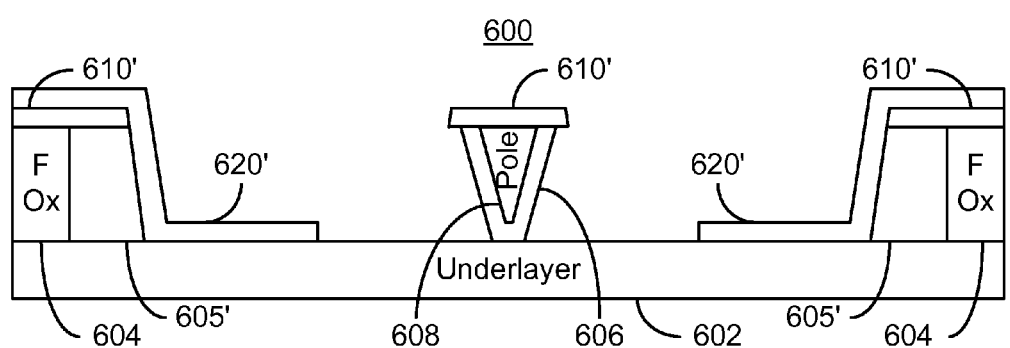

The portion of the intermediate layer 605' exposed by the stop layer 620' is removed using a wet etch, via step 512. The stop layer 620' is resistant to removal by the wet etch. FIG. 23 depicts an ABS view of the transducer 600 after step 512 has been performed. Thus, the underlayer 602 has been exposed. Because of the presence of the stop layer 620', only the intermediate layer 605' under the stop layer 620' remains.

Figure 24:
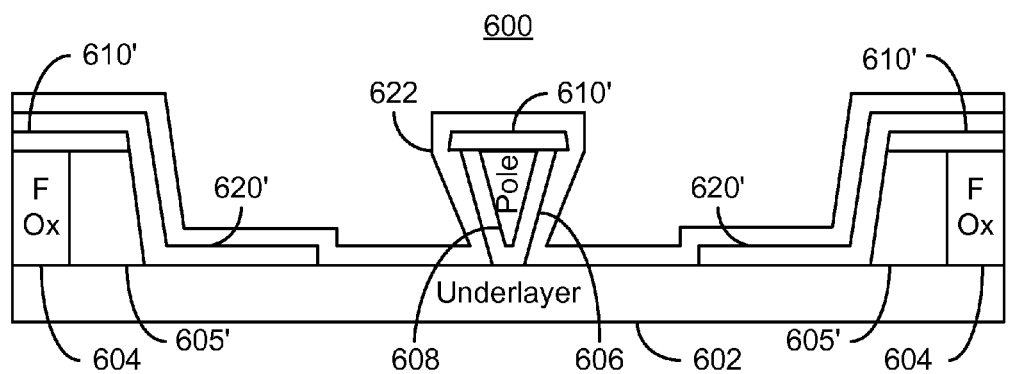
Figure 25:
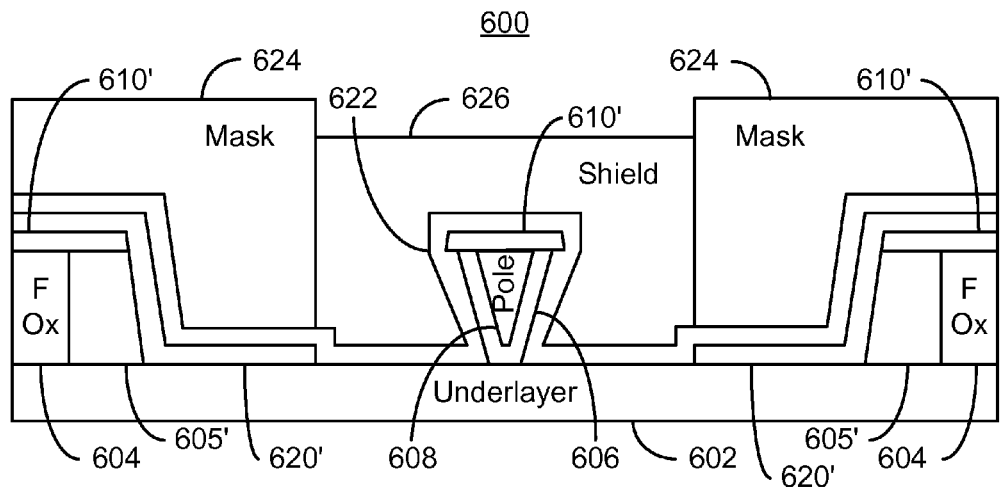

A wrap-around shield for the main pole is provided in steps 514, 516, and 518. The seed layer for the wrap-around shield is deposited, via step 514. FIG. 24 depicts the transducer 600 after step 514 is completed. Thus, a seed layer 622 is shown. A wrap-around shield mask is provided, via step 516. The wrap-around shield mask exposes the portion of the transducer 600 in which the wrap-around shield is to be provided. The mask thus covers a portion of the transducer 600 that includes the edges of the stop layer 620'. In some embodiments, the edges of the wrap-around shield mask would reside closer to the pole than the outer edges of the trenches 616 formed in step 504. The magnetic layer(s) for the wrap-around shield are deposited, via step 518. Step 518 may include plating the shield materials. FIG. 25 depicts the transducer 600 after step 518 has been performed. Thus, wrap-around shield mask 624 and wrap-around shield 626 are shown. The shield 626 may include materials such as NiFe.

Figure 26:
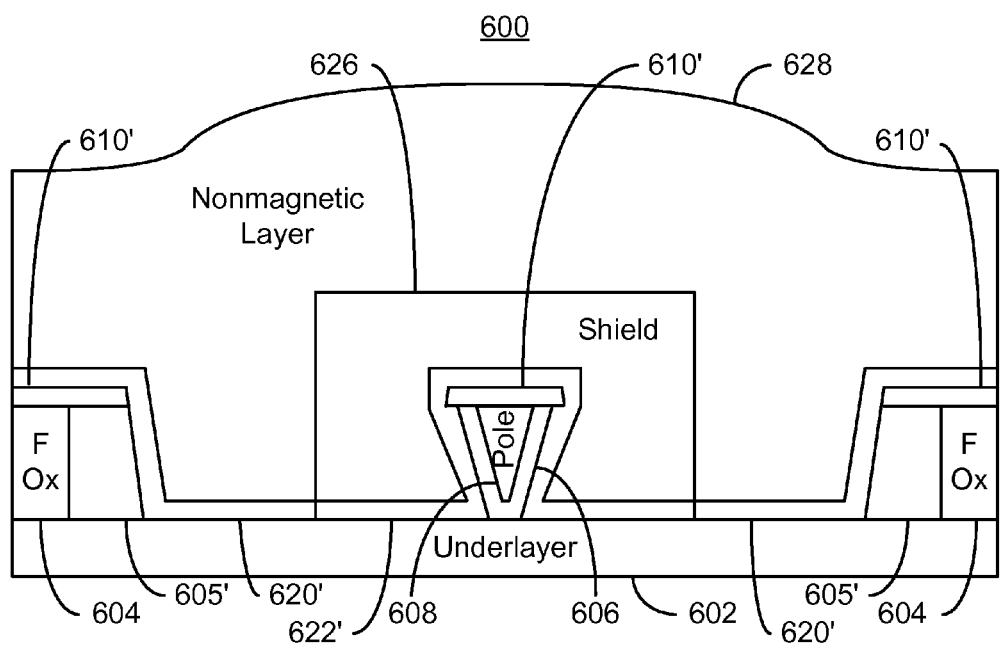

The wrap-around shield mask 624 is removed, via step 520. The seed layer may also be removed in step 520, for example through a full film ion mill. Thus, a space between the shield 626 and the stop layer 620' is opened. A nonmagnetic layer covering at least the wrap-around shield 626 is provided, via step 522. Thus, the space opened in step 520 is refilled in step 522. In some embodiments, step 522 includes depositing a layer of aluminum oxide. FIG. 26 depicts an ABS view of the transducer 600 after step 522 is performed. Thus, nonmagnetic layer 628 is shown. Further, as the shield 626 protrudes slightly with respect to the stop layer 620'. The nonmagnetic layer 628 protrudes further, as shown in FIG. 26.

Figure 27:
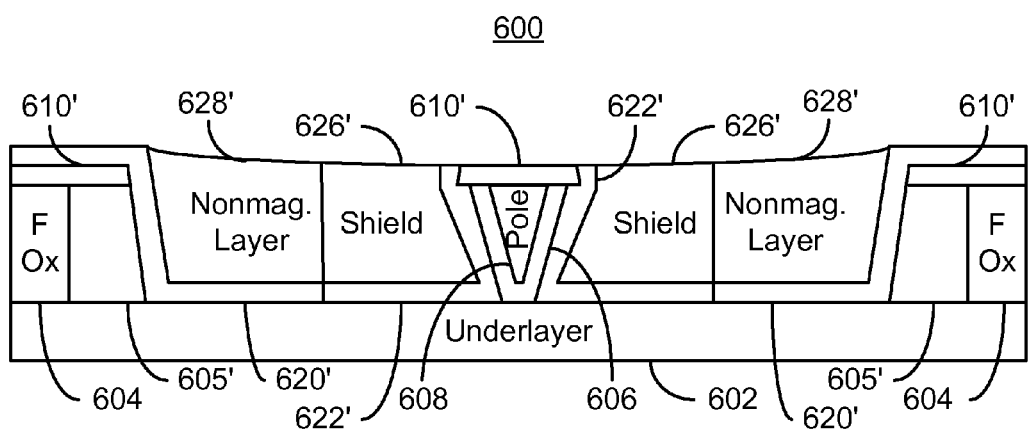

A CMP of the transducer 600 is performed, via step 524. The CMP performed in step 524 is configured to remove the nonmagnetic layer 628. Thus, in some embodiments, the CMP is an aluminum oxide CMP. The stop layer 620' is a stop layer for the CMP performed in step 524. Thus, the stop layer 620' is resistant to removal by the CMP of step 524. Thus, as previously discussed, the stop layer 620' may be a Ru layer. FIG. 27 depicts an ABS view of the transducer 600 after step 524 is performed. As the CMP is configured to remove aluminum oxide and the region above the pole 608 protrudes, portions of the nonmagnetic layer 628 and shield 626 have been removed. Nonmagnetic layer 628' and shield 626' remain. Because the stop layer 620' is a stop layer for the CMP, at least a portion of the stop layer 620' remains.

Figure 28:
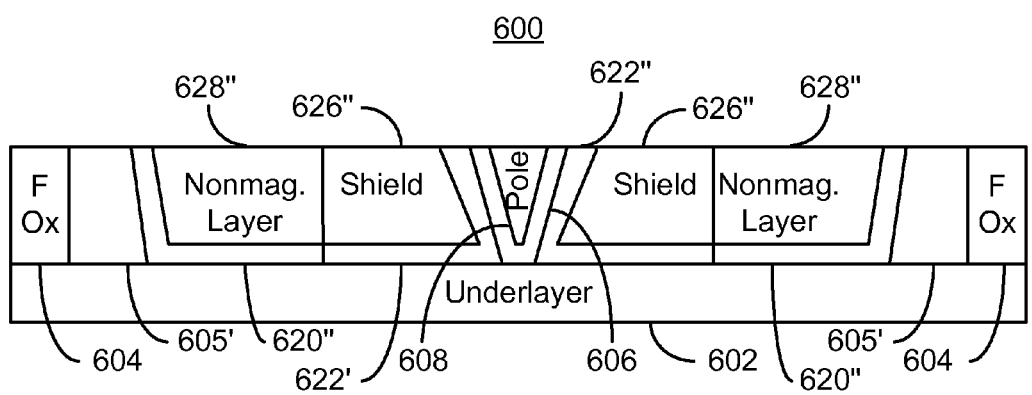

However, as shown in FIG. 27, there may be some dishing after the CMP of step 524 is performed. Thus, an ion mill may be performed, via step 526. FIG. 28 depicts an ABS view of the transducer 600 after step 526 is performed. Thus, portions of the stop layer 620' and mask layer 610' have been removed. Stop layer 620" remains, while in the embodiment shown, the mask layer 610'may be completely removed. Portions of the shield 626" also remain. In addition, the top surface of the transducer 600 is substantially flat.

Figure 29:
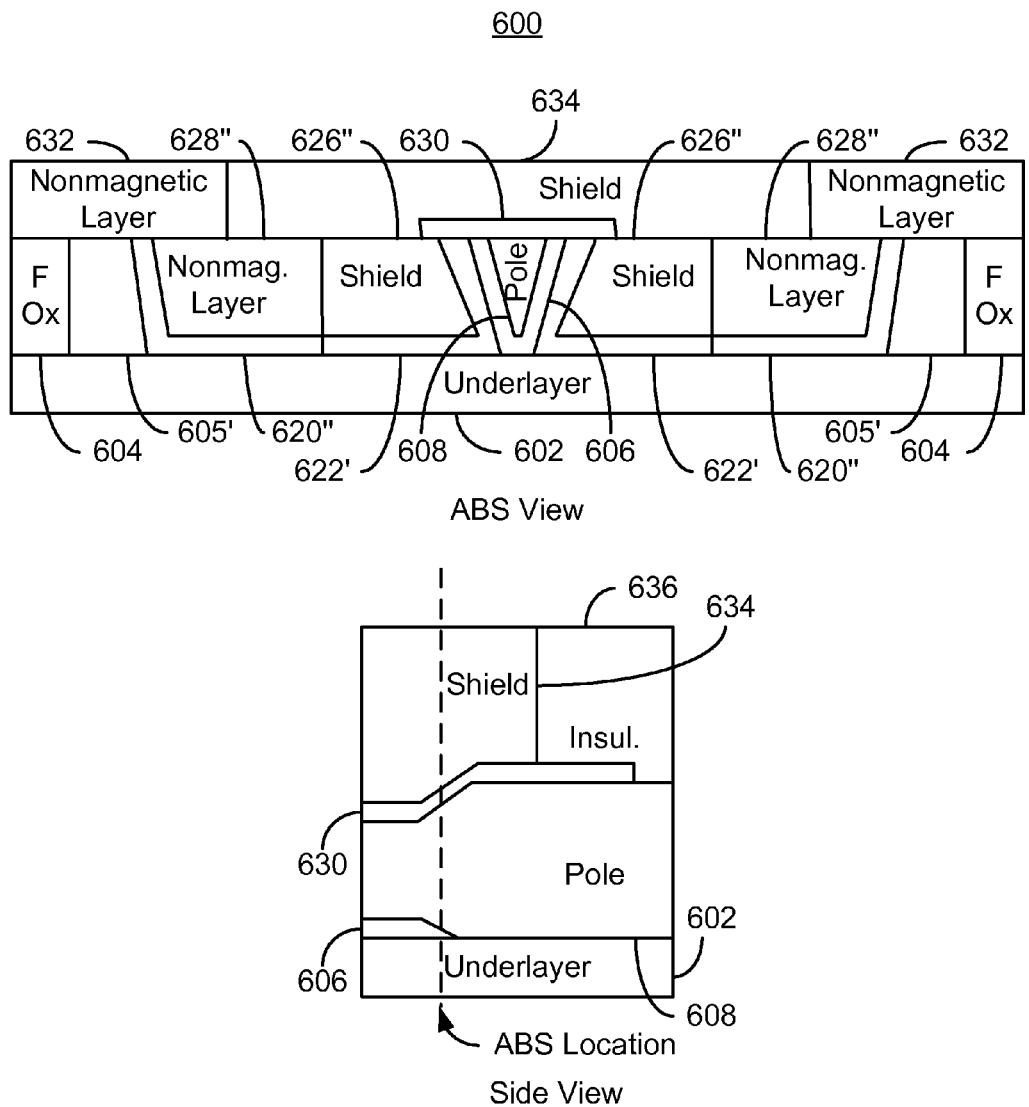

A gap layer is provided on the main pole, via step 528. Step 528 may include depositing a conductive or insulating nonmagnetic layer. For example, aluminum oxide may be used as an insulating, nonmagnetic gap layer. Ru may be used as the conductive gap layer. Providing the gap layer in step 528 may include depositing the gap layer, then removing the gap away from the pole. A top shield that covers at least the gap layer is provided, via step 530. In some embodiments, the top shield physically connects with the wrap-around shield 626". However, in other embodiments, the gap layer may be interposed completely between the top shield and the wrap-around shield 626". FIG. 29 depicts ABS and side views of the transducer 600 after step 530 is performed. Thus, gap layer 632 and top shield 634 are shown. In addition, a nonmagnetic layer 632 and an insulating layer 636 have also been provided. In the embodiment shown, the wrap-around shield 626" and top shield 634 wrap around the pole 608. Thus, the top shield 634 and shield 626" may be considered to form the wrap-around shield. In some embodiments, the insulating layer 636 and nonmagnetic layer 632 may be the same material. In the embodiment shown, the main pole 608 includes leading and trailing edge bevels. However, in other embodiments, the leading edge bevel and/or the trailing edge bevel may be omitted.

Using the method 500, a transducer 600 having improved yield and performance may be fabricated. In particular, the transducer 600 may share the benefits of the transducer 400. In addition, an ion mill need not be performed to remove the layer 610' from the top of the pole 608 until after the CMP of step 524. Consequently, fabrication may be further improved.

We claim:

1. A method for fabricating a magnetic recording transducer having a main pole including a plurality of sides, an intermediate layer adjacent to the plurality of sides of the main pole, and a field region distal from the main pole, the method comprising:
providing at least one trench in the intermediate layer, the at least one trench residing between the main pole and the field region;
providing a stop layer, a portion of the stop layer residing in at least part of the at least one trench and on at least part of the field region, the stop layer having at least one edge in the at least one trench;
removing a portion of the intermediate layer using a wet etch, the stop layer being resistant to removal by the wet etch;
depositing a wrap-around shield layer on the main pole.

2. The method of claim 1 further comprising:
depositing a nonmagnetic layer covering the wrap-around shield layer;
planarizing the magnetic transducer, the stop layer being a stop layer for the planarizing.

3. The method of claim 2 further comprising:
providing a gap layer on the main pole; and
providing a top shield covering at least the gap layer.

4. The method of claim 3 wherein the top shield is in contact with the wrap-around shield layer.

5. The method of claim 1 wherein the step of providing the at least one trench further includes:
providing a mask for including at least one aperture corresponding to the at least one trench; and
performing at least one reactive ion etch to form the at least one trench.

6. The method of claim 5 wherein the step of providing the at least one trench further includes:
performing a touch wet etch after the at least one reactive ion etch.

7. The method of claim 1 further comprising:
providing a mask before the step of providing the stop layer, the mask having a plurality of mask edges and covering the main pole, the plurality of mask edges residing in the at least one trench; and
wherein the step of providing the stop layer further includes
blanket depositing the stop layer; and
removing the mask before the wet etch.

8. The method of claim 1 further including:
providing a wet etch mask having an aperture therein, wherein the aperture of the wet etch mask exposes a portion of the transducer including a region covered by the wrap-around shield.

9. The method of claim 1 wherein the stop layer includes Ru.

10. The method of claim 1 wherein the main pole has a bottom and a top wider than the bottom.

11. A method for fabricating a magnetic recording transducer having a main pole including a plurality of sides, an intermediate layer adjacent to the plurality of sides of the main pole, and a field region distal from the main pole, the method comprising:
providing at least one trench in the intermediate layer, the at least one trench residing between the main pole and the field region;
providing a stop layer, a portion of the stop layer residing in at least part of the at least one trench and on at least part of the field region, the step of providing the stop layer further including
blanket depositing the stop layer;
providing a frame mask covering the portion of the stop layer and having an aperture therein, the aperture exposing the main pole and a portion of the intermediate layer; and
removing an exposed portion of the stop layer uncovered by the frame mask;
removing a portion of the intermediate layer using a wet etch, the stop layer being resistant to removal by the wet etch; and
depositing a wrap-around shield layer on the main pole.

12. The method of claim 11 wherein the step of removing the exposed portion further includes:
performing an ion mill.

13. The method of claim 11 wherein the step of removing the portion of the intermediate layer using the wet etch further includes:
performing the wet etch while the frame mask is in place.

14. The method of claim 11 wherein a portion of the wrap-around shield layer is deposited in the aperture of the frame mask.

15. A method for fabricating a magnetic recording transducer having a main pole including a plurality of sides, an intermediate layer adjacent to the plurality of sides of the main pole, and a field region distal from the main pole, the method comprising:
providing a mask including at least one trench aperture between the main pole and the field region;

performing at least one reactive ion etch to form at least one trench in the intermediate layer between the main pole and the field region;

blanket depositing a Ru layer;

providing a frame mask covering a portion of the Ru layer and having an aperture therein, the portion of the Ru layer residing in at least part of the at least one trench and on at least part of the field region, the aperture exposing the main pole and a portion of the intermediate layer;

removing an exposed portion of the Ru layer uncovered by the aperture in the frame mask;

removing the portion of the intermediate layer using a wet etch while the frame mask is in place, the Ru layer being resistant to removal by the wet etch;

provide wrap-around shield mask having a pole aperture;

providing a wrap-around shield on the main pole and in the pole aperture;

removing the wrap-around shield mask;

providing a nonmagnetic layer covering at least the wrap-around shield;

performing a chemical mechanical polish (CMP) of the transducer, the Ru layer being a stop layer for the CMP;

providing a gap layer on the main pole; and providing a top shield covering at least the gap layer.

16. A method for fabricating a magnetic recording transducer having a main pole including a plurality of sides, an intermediate layer adjacent to the plurality of sides of the main pole, and a field region distal from the main pole, the method comprising:

providing a mask for including at least one trench aperture between the main pole and the field region; and performing at least one reactive ion etch to form at least one trench in the intermediate layer between the main pole and the field region;

providing a mask, the mask having a plurality of mask edges and covering the main pole, the plurality of mask edges residing in the at least one trench;

blanket depositing a Ru layer;

removing the mask after deposition of the Ru layer;

removing the portion of the intermediate layer using a wet etch, the Ru layer being resistant to removal by the wet etch;

providing a wrap-around shield mask having an aperture therein, the aperture corresponding to a location of a wrap-around shield;

providing the wrap-around shield on the main pole and in the aperture;

removing the wrap-around shield mask;

providing a nonmagnetic layer covering at least the wrap-around shield;

performing a chemical mechanical polish (CMP) of the transducer, the Ru layer being a stop layer for the CMP;

providing a gap layer on the main pole; and providing a top shield covering at least the gap layer.

* * * * *